Jan. 30, 1962  K. D. CHUMLEY  3,018,912
STOPPER ATTACHMENT FOR A VACUUM BOTTLE
Filed Jan. 28, 1960
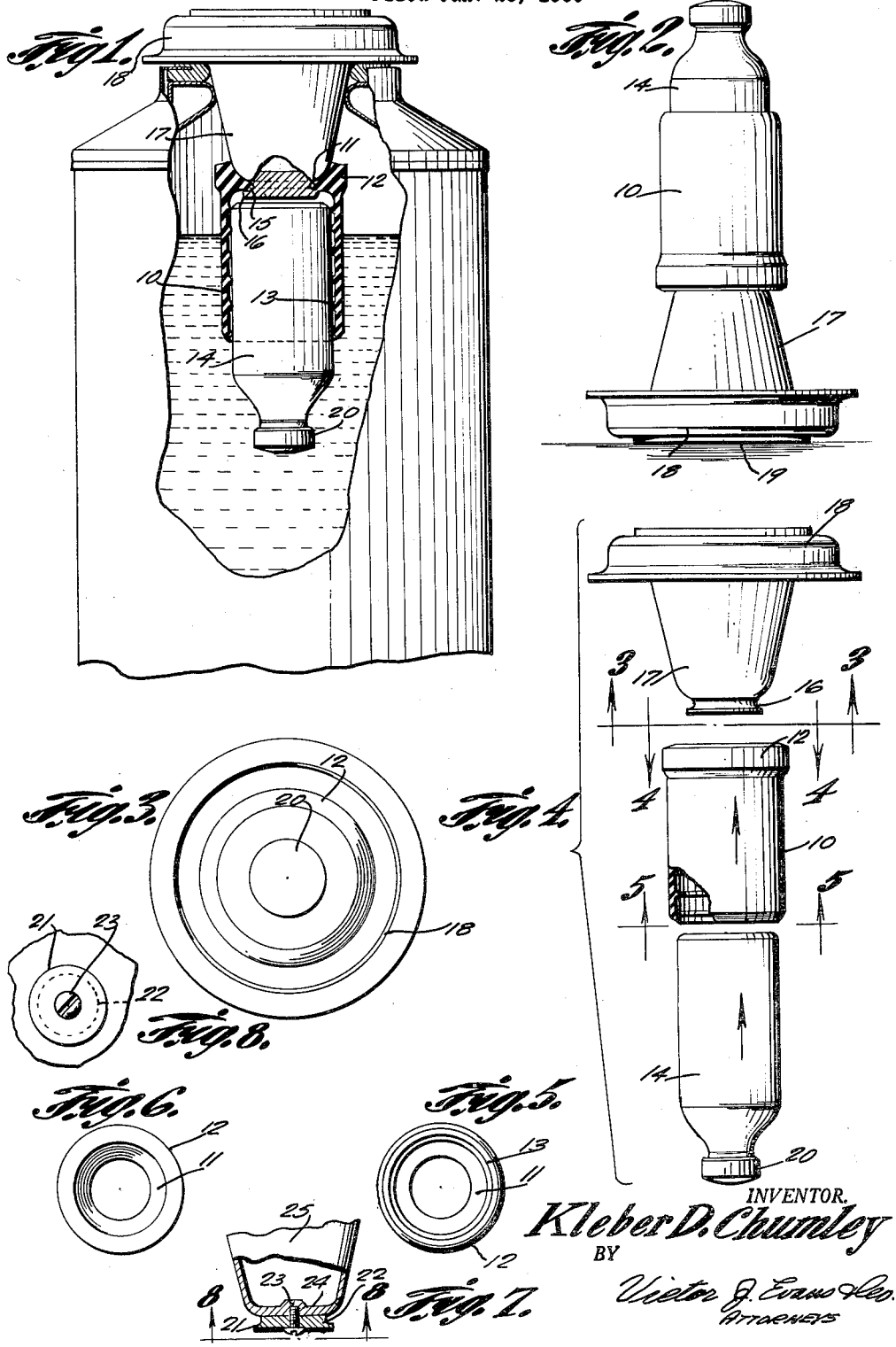
INVENTOR.
Kleber D. Chumley
BY
Victor J. Evans Co.
ATTORNEYS United States Patent Office 3,018,912
Patented Jan. 30, 1962

1

3,018,912
STOPPER ATTACHMENT FOR A VACUUM BOTTLE
Kleber Doyles Chumley, Tazewell, Tenn.
Filed Jan. 28, 1960, Ser. No. 5,238
3 Claims. (Cl. 215—100)

This invention relates to vacuum bottles of the type having a double wall and used for maintaining products hot or cold, and in particular an attachment of rubber or other resilient material designed to be snapped over a bead on the lower end of a stopper of a vacuum bottle and having a resilient sleeve for retaining a small bottle therein whereby a small bottle, such as a bottle of insulin may be suspended from the lower end of a stopper of a vacuum bottle and subjected to hot or cold elements in the bottle.

The purpose of this invention is to provide means for maintaining insulin or other medicaments at a desired temperature, particularly in traveling.

Insulin and other medicaments should be maintained at a constant temperature and, particularly in traveling, it is difficult to control the temperature of a small bottle with conventional refrigerating means. With this thought in mind it is desirable to provide means for supporting a small bottle of insulin, or the like in a vacuum bottle whereby the bottle of insulin may be removed and replaced at regular intervals.

The object of this invention is, therefore, to provide means for supporting a small bottle of insulin from a cork of a vacuum bottle whereby the insulin may be removed and replaced as desired.

Another object of the invention is to provide means for suspending a small bottle of medicament or the like in a vacuum bottle whereby means is provided for supporting the small bottle from the stopper of a bottle without changing the bottle.

A further object of the invention is to provide means for attaching a small bottle to the stopper of a vacuum bottle in which the attaching means is of a simple and economical construction.

With these and other objects and advantages in view the invention embodies a sleeve of resilient material having means at one end of the sleeve for attaching the sleeve to a stopper of a vacuum bottle and means at the opposite end for retaining a bottle in the sleeve.

Other features and advantages of the invention will appear from the folowing description taken in connection with the drawings, wherein:

FIGURE 1 is a side elevational view showing the upper end of a conventional vacuum bottle with a small bottle suspended by a sleeve of resilient material from the lower end of the stopper of the vacuum bottle.

FIGURE 2 is a side elevational view illustrating the assembly of the small bottle and attaching sleeve on the stopper of a vacuum bottle.

FIGURE 3 is a view looking upwardly toward the lower end of a small bottle with the parts assembled as shown in FIGURE 1.

FIGURE 4 is a side elevational view showing an exploded view of the small bottle, attaching sleeve, and conventional stopper.

FIGURE 5 is an end elevational view looking toward one end of the attaching sleeve.

FIGURE 6 is a view looking toward the opposite end of the attaching sleeve.

FIGURE 7 is a view showing a modification wherein a bead or button is secured to the lower end of the stopper of a vacuum bottle by a screw.

2

FIGURE 8 is a view looking upwardly toward the lower end of the stopper shown in FIGURE 7 being taken on line 8—8 of FIGURE 7.

Referring now to the drawing wherein like reference characters denote corresponding parts the small bottle suspending attachment of this invention includes a sleeve 10 of resilient material having an inwardly extended rib 11 on the inside of a rim 12 at the upper end and, as illustrated in FIGURE 1, the inner surface of the sleeve portion 10 may be provided with spaced annular ribs 13 to facilitate gripping a small bottle 14 positioned in the sleeve.

The rib 11 on the inner surface of the rim 12 at the upper end of the sleeve is designed to snap into an annular groove 15 fromed by a bead or ring 16 on the lower end of a stopper 17 which depends from a head 18.

The head 18 of the stopper is preferably formed with a flat surface 19 to facilitate retaining the attachment and bottle in an upright position so that the bottle may be supported as material is used therefrom. The bottle 14 is provided with a stopper 20 that seals the lower end of the bottle with the bottle in an inverted position, as shown in FIGURE 1.

The annular bead or button 16 may be molded with the stopper 17, as shown in FIGURE 1 or the button or bead may be attached to the lower end of the stopper as illustrated in FIGURES 7 and 8 wherein a rim 21 having a base portion 22 is secured by a screw 23 to the lower end 24 of a stopper 25. The button or bead 21 may be of any type or design and may be integral with or secured to the stopper 17, as may be desired.

The sleeve 10 may be of rubber, or other suitable resilient material.

It will be understood that other modifications, within the scope of the appended claims, may be made in the design and arrangement of the parts without departing from the spirit of the invention.

What is claimed is:

1. A medicament bottle support comprising a sleeve extended over a portion of the body of a bottle and having an inwardly disposed rib spaced from the upper end for suspending the sleeve with the bottle therein from a button on the lower end of a stopper of the bottle, the bottle being suspended in an inverted position within a vacuum bottle.

2. In a medicament bottle support, the combination which comprises an elongated sleeve having integral upper and inner spaced inwardly disposed annular ribs on the inner surface and a bottle stopper having an annular bead on the lower end, said bead receiving the annular inwardly disposed rib spaced from the upper end of the sleeve.

3. A medicament bottle support comprising a bottle receiving sleeve having longitudinally spaced annular ribs on the inner surface and having an inwardly disposed rib spaced from a rim on the upper end, said rib on the inner surface of the rim of the sleeve being positioned to snap over an annular bead on the lower end of a bottle stopper to suspend the bottle in an inverted position within a vacuum bottle.

References Cited in the file of this patent

UNITED STATES PATENTS

| | | |
|---|---|---|
| 1,890,323 | Glaeser | Dec. 6, 1932 |
| 2,630,233 | Kircher | Mar. 3, 1953 |
| 2,706,571 | Ryan | Apr. 19, 1955 |
| 2,718,973 | Dahl et al. | Sept. 27, 1955 |
| 2,738,890 | Dahl et al. | Mar. 20, 1956 |